United States Patent

Hansen et al.

(10) Patent No.: US 8,196,305 B1
(45) Date of Patent: Jun. 12, 2012

(54) TURBINE BLADE MEASURING DEVICE

(75) Inventors: Brian Patrick Hansen, Greenville, SC (US); Clayton Griswold Taylor, Piedmont, SC (US); William Eugene McClary, Jr., North Charleston, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/012,837

(22) Filed: Jan. 25, 2011

(51) Int. Cl.
*G01B 5/20* (2006.01)
(52) U.S. Cl. .......................................... 33/530
(58) Field of Classification Search ............... 33/530
See application file for complete search history.

(56) References Cited

U.S. PATENT DOCUMENTS

| | | | | |
|---|---|---|---|---|
| 1,597,357 A | * | 8/1926 | Godfrey | 33/530 |
| 1,696,525 A | * | 12/1928 | Coolidge | 33/530 |
| 2,172,368 A | * | 9/1939 | Eby | 33/530 |
| 2,238,782 A | * | 4/1941 | Roche | 33/530 |
| 2,265,373 A | * | 12/1941 | Johnson | 33/530 |
| 2,358,987 A | * | 9/1944 | MacKay | 33/530 |
| 2,737,722 A | * | 3/1956 | Keim | 33/286 |
| 4,056,888 A | * | 11/1977 | Hughey, Jr. | 33/530 |
| 4,265,023 A | * | 5/1981 | Frost et al. | 356/614 |
| 5,152,070 A | * | 10/1992 | Sorokes | 33/530 |
| 6,532,678 B2 | * | 3/2003 | Morgan | 33/530 |
| 7,296,362 B2 | * | 11/2007 | Chang | 33/530 |
| 7,637,026 B2 | * | 12/2009 | Tu | 33/530 |
| 7,681,325 B2 | | 3/2010 | Sassatelli et al. | |

* cited by examiner

*Primary Examiner* — Christopher Fulton
(74) *Attorney, Agent, or Firm* — Nixon & Vanderhye P.C.

(57) ABSTRACT

A measuring device is capable of measuring one or more aspects of a compressor blade or a turbine blade of a turbine engine at a plurality of predetermined positions along the blade. The measuring device can be disassembled so that individual elements of the measuring device can be moved into the confined space where a first row of compressor blades or turbine blades of a turbine engine are located. The elements can then be reassembled in this space and attached to a turbine blade so that measurement on the blade can then be acquired.

19 Claims, 8 Drawing Sheets

TURBINE BLADE MEASURING DEVICE

BACKGROUND OF THE INVENTION

Turbine engines are commonly used in the electrical power generation industry. Such turbine engines include a compressor section where air which has been drawn into the turbine engine is compressed. The compressed air is mixed with fuel and burned in a combustor section. The hot expanding combustion gases are then routed into a turbine section which provides the motive power generated by the turbine engine.

The compressor section of the turbine engine includes alternating rows of stator vanes and compressor blades. The compressor blades are mounted on a rotating shaft of the turbine engine. The stator vanes are attached to the housing of the compressor. Each row of stator vanes helps to direct the air flowing through the compressor into the next row of compressor blades at an angle designed to facilitate compression of the incoming air.

The turbine section of the engine also includes a plurality of alternating rows of stator vanes and turbine blades. The turbine blades are also attached to the shaft of the engine. The stator vanes are attached to the housing of the turbine section of the engine. Each row of the stator vanes helps to direct the hot combustion gases onto the next row of turbine blades at an angle that facilitates the generation of power by the turbine section.

Although the stator vanes, compressor blades and turbine blades are made up of highly durable materials, over an extended period of time air and moisture flowing at high speed and at high volumes over the blades can cause the material of the blades to erode. In some instances, small particles such as dust and sand in the air passing through a turbine can also contribute to erosion of the blades. Similarly, the hot combustion gases can cause the turbine blades in the turbine section to erode as well. In the compressor section, water or water vapor may be injected into the flow of air passing through the compressor to help clean the compressor section and/or to cool the air. The water droplets or water vapor within the airflow can cause blade erosion.

Excessive erosion of compressor and turbine blades can weaken the blades, which could lead to premature failure of the turbine engine. In addition, erosion of the blades can change the shape of the blades, resulting in less efficient operation of the turbine engine.

Unfortunately, it is difficult to determine the degree of erosion of the blades without directly measuring the blades. And accessing the compressor and turbine blades to take such measurements is very difficult. As a result, operators and manufacturers estimate the useful life of the blades through analytic calculations. If such estimates are too conservative, it can result in premature replacement of the blades, which wastes time and money. If such estimates are too liberal, it can result in failure of a turbine engine, which would be even more costly.

BRIEF DESCRIPTION OF THE INVENTION

A turbine blade measuring device according to a first aspect of the invention includes a clamp configured to be removably clamped onto a turbine blade, a guide that is removably mountable on the clamp, and a measuring device that is movably mountable on the guide. The measuring device is configured to measure an aspect a turbine blade.

A turbine blade measuring system according to another aspect of the invention includes a clamp that is configured to be removably clamped to a base of a turbine blade, a support post that is removably mountable on the clamp, where the support post includes a plurality of positioning apertures located along a length of the support post. The measuring system also includes a measuring head that is mounted on the support post, the measuring head comprising a positioning aperture that is configured to receive the support post such that the measuring head can slide along the support post. A positioning pin in the measuring head engages the positioning apertures on the support post. The measuring head also includes at least one contact arm that is movably mounted on the measuring head, wherein the measuring head is configured to measure an aspect a turbine blade.

DETAILED DESCRIPTION OF THE INVENTION

In the following description, there are numerous references to a turbine blade. This term is intended to encompass both the rotating blades in a compressor section of a turbine engine, the rotating blades in a turbine section of a turbine engine, as well as the stator vanes located in both the compressor and turbine sections of a turbine engine.

Figure 1:
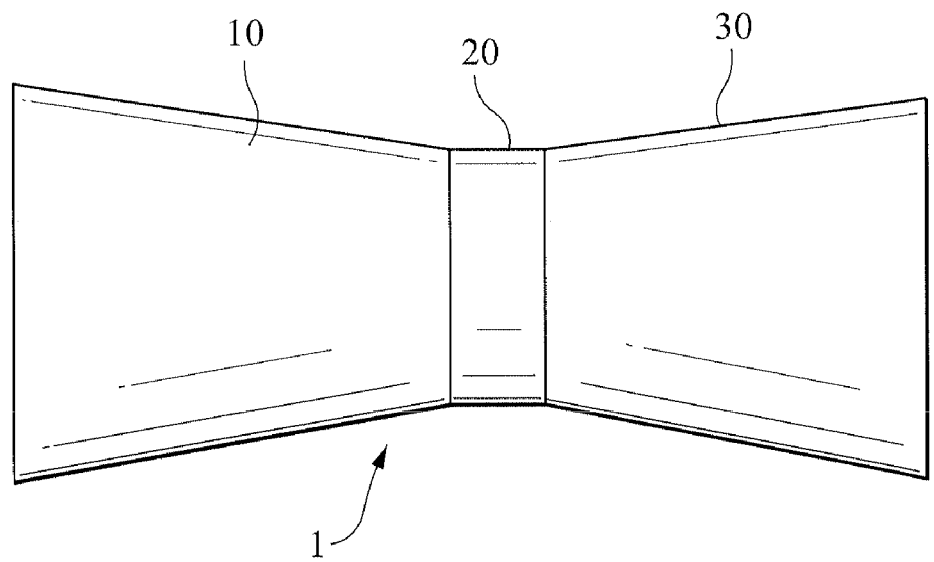
FIG. 1 is a diagram of a turbine engine.

FIG. 1 illustrates the major elements of a typical turbine engine which could be used in the power generation industry. The turbine engine 1 includes a compressor section 10, a combustor 20 and a turbine section 30. As explained above, the compressor section would have a plurality of alternating rows of stator vanes and compressor blades. Likewise, the turbine section would have a plurality of alternating rows of stator vanes and turbine blades.

Figure 2:
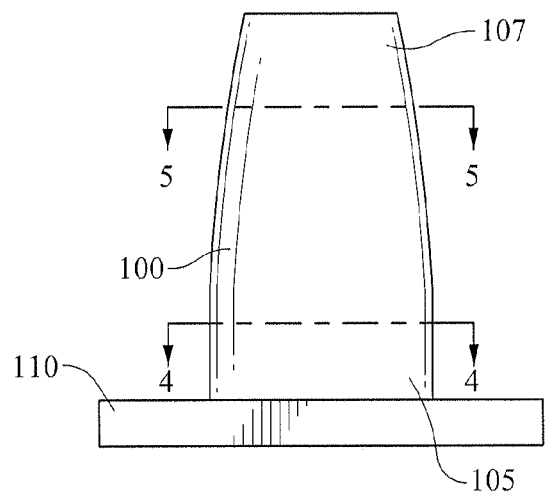
FIG. 2 is an elevation view of a turbine blade on a base.

FIG. 2 shows a typical rotating turbine blade 100 mounted on a mounting base 110. The turbine blade illustrated in FIG. 2 could be either a compressor blade in a compressor section, or a turbine blade in a turbine section.

Figure 3:
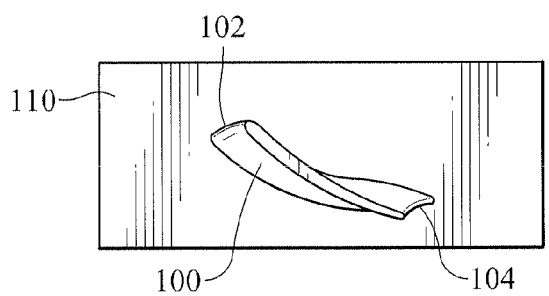
FIG. 3 is a top view of the turbine blade and base illustrated in FIG. 2.

FIG. 3 is a top view of the blade 100 illustrated in FIG. 2. As shown in FIG. 3, the body of the turbine blade twists as it extends upward from the mounting base 110. Also, as illustrated in FIG. 2, the chord length of the turbine blade, between the leading edge 102 and the trailing edge 104, changes as one progresses upward from the base 105 of the blade to the top 107 of the blade. Usually, the chord length becomes smaller as one progresses from the base to the tip of the blade. In some instance, however, the chord length may become smaller as one progresses from the base to the tip of the blade.

Figure 4:
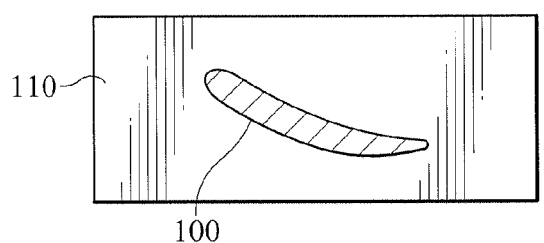
FIG. 4 is a cross-sectional view of the turbine blade and base illustrated in FIG. 2, taken along Section Line 4-4.
Figure 5:
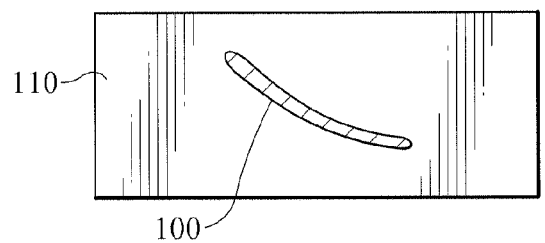
FIG. 5 is a cross-sectional view of the turbine blade and base illustrated in FIG. 2, taken along Section Line 5-5.

FIG. 4 is a cross-sectional view of the turbine blade 100 taken along Section Line 4-4 in FIG. 2. FIG. 5 is a cross-sectional view of the turbine blade 100 taken along Section Line 5-5 in FIG. 2. As illustrated in FIGS. 4 and 5, the chord length of the blade is smaller at Section Line 5-5 than at Section Line 4-4. Also, the thickness of the blade is greater at the base 105 of the blade than at the top 107 of the blade. Thus, both the thickness and the chord length vary as one progresses from the base 105 of the blade to the top 107 of the blade.

As explained above, various operating conditions within a turbine engine can result in erosion of the material forming the stator vanes, compressor blades and turbine blades. This can result in the chord length of the blade at any given height becoming smaller than when the blade is first installed. Likewise, this can result in a thickness of the blade at any given height becoming smaller than when the blade is first installed.

If excessive erosion of a turbine blade severely weakens the turbine blade, it could result in the blade breaking during operation of the turbine engine, which would likely cause extensive and extremely expensive damage to the turbine engine. Also, erosion of a blade can change its shape, which can negatively impact the efficiency and/or power output of the turbine engine.

To ensure that the blades of a turbine engine have not eroded to a dangerous or undesirable degree, one would like to measure the turbine blades at periodic intervals to determine their degree of erosion. Unfortunately, it is very difficult to access the blades to carry out such measurements.

Typically, the first row of blades in a compressor section of a turbine engine will comprise stator vanes that are attached to the housing of the turbine engine. The first row of rotating blades is located behind the first row of stator vanes. During some routine maintenance operations, it is possible to gain access to the first row of rotating compressor blades, but only by reaching through adjacent pairs of the stator vanes which are located in front of the first row of rotating blades.

Likewise, in some instances it is possible to access the last row of rotating blades in the turbine section of a turbine engine. Reaching the first row of rotating blades in a turbine section is often impossible, or very difficult.

Because the only way to physically access the first row of rotating compressor blades is to reach through adjacent pairs of the stator vanes, it is very difficult to use any type of large measuring device to physically measure the dimensions of the rotating blades. Likewise, often it is only possible to reach the last row of rotating blades of the turbine section through adjacent pairs of stator vanes, making it difficult to use any type of large measuring device to physically measure the dimensions of the rotating blades.

Also, because the chord length and thickness of a blade varies over the length of the blade, one must be careful to take two successive measurements at two points in time at virtually the same height along the blade, and consistently parallel to a vertical plane. Otherwise, a difference in the two measurements will not have any probative value. Thus, to obtain useful data, it is necessary to obtain the measurements at highly repeatable positions on the blade.

Because of the difficulty in accessing the blades in the first place, conducting measurements on the blades at repeatable positions along a blade is also quite difficult. Doing so would normally require a relatively large mechanism that constrains the positioning of the measurement device such that it is always positioned at the same locations on a blade during each measurement cycle. And it is impossible to insert such a large mechanism between adjacent stator vanes and into the space where the rotating blades are located. Likewise, even if it were possible to insert the device into the space, there is very little space between the rotating blades to mount such a mechanism.

A measuring device capable of carrying out such repeatable measurements on rotating blades of a turbine engine is illustrated in FIGS. 6-11. The measuring device includes multiple parts which can be disassembled from each other so that each of the individual parts can be passed between two adjacent stator vanes of a turbine engine and into the space where the first row of compressor blades or turbine blades would be located. The measuring device can then be re-assembled and mounted onto a turbine blade in the space where the rotating blades are located. The measuring device is also configured to take a plurality of measurements at predetermined repeatable locations along the length of a turbine blade.

Figure 6:
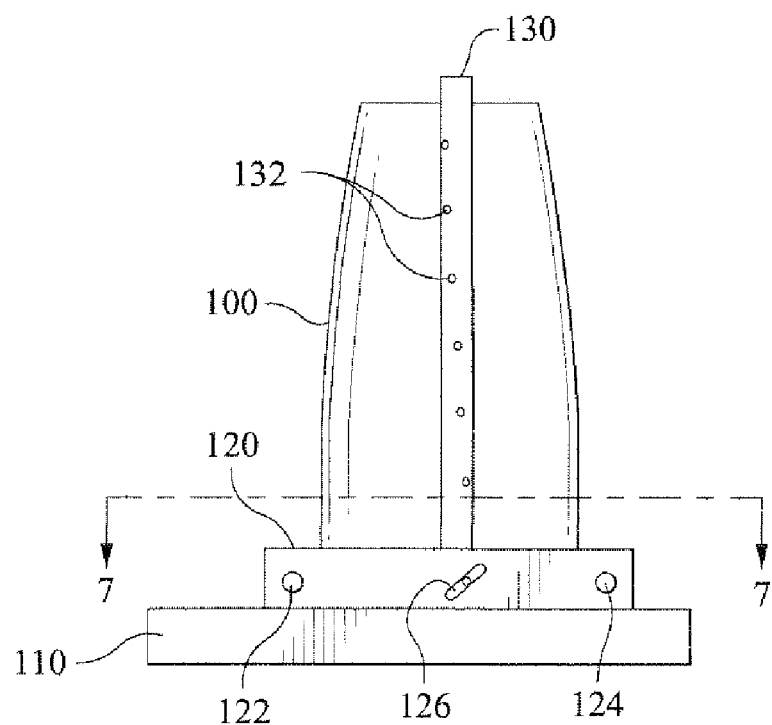
FIG. 6 is an elevation view of a turbine blade with portions of a measuring device mounted on the blade.
Figure 7:
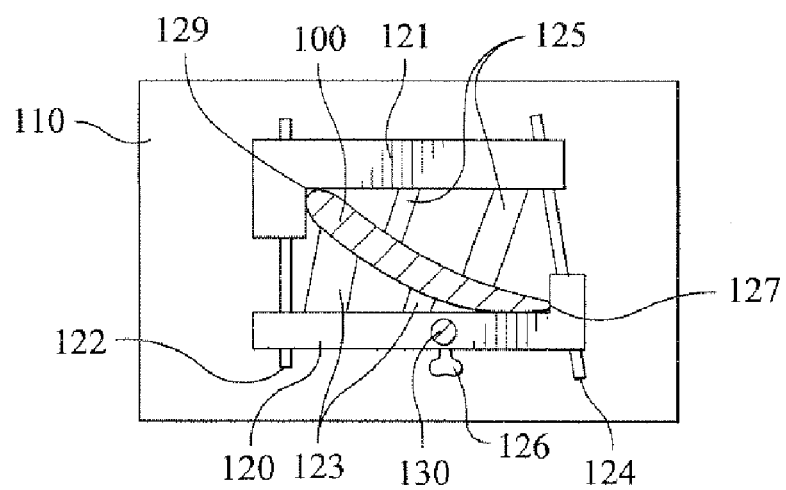
FIG. 7 is a cross-sectional view of the turbine blade and measuring device illustrated in FIG. 6, taken along Section Line 7-7.

The measurement device includes a clamp which includes a first clamp portion 120 and a second clamp portion 121, as illustrated in FIGS. 6 and 7. The first clamp portion 120 is configured to engage a first side and/or end of a turbine blade 110, and the second clamp portion 121 is designed to engage the second opposite side and/or end of the turbine blade 100.

In the embodiment illustrated in FIGS. 6 and 7, the first clamp portion 120 includes a plurality of spacing legs 123. In addition, a first end of the first clamp portion 120 includes a 90° L-shaped corner 127 which is designed to abut the leading or trailing edge of the turbine blade 100. Likewise, the second clamp portion 121 includes spacing legs 125 and a 90° L-shaped corner 129 which is designed to abut the opposite edge of the turbine blade 100.

As illustrated in FIG. 7, clamp fasteners 122, 124 are used to attach the first clamp portion 120 to the second clamp portion 121 and to draw the two clamp portions together so that they clamp onto a base of a turbine blade 100. The provision of the L-shaped corners at the ends of the first and second clamp portions, and the spacing legs 123, 125 ensures that the clamp mechanism will always clamp around the base of a turbine blade 100 in the essentially same orientation.

The locations, length and contours of the spacing legs 123, 125 may be designed to accommodate a specific shaped turbine blade. Because of their custom shape and design, the first and second clamp portions 120, 121 would always be attached to that type/shaped turbine blade at the same location. When the clamping portions and spacing legs are custom designed for a particular shaped blade, it is necessary to use different clamping portions for different blades.

In other embodiments, the shape of the clamp portions may be generic, and therefore designed to be clamped around various different shaped turbine blades. In this instance, although the clamping portions would be designed for use with multiple different shaped blades, for any given blade, the clamping portions would still attach to the blade at the same repeatable location/orientation each time, to ensure that the measurements of the blade are taken at repeatable locations during different measurement cycles.

In still other embodiments, although generic clamping portions may be designed to work with multiple different shaped blades, a single set of generic clamping portions may only be designed to accommodate a particular range of blade sizes. In this instance, one set of generic clamping portions may be designed to work with a first range of smaller sized blades, and a second set of generic clamping portions are designed to work with a second set of larger sized blades.

A support post 130 is inserted into a cylindrical aperture formed in one of the clamping portions. In the embodiment illustrated in FIGS. 6 and 7, the support post 130 is inserted into a cylindrical aperture in the first clamp portion 120. In alternate embodiments, the support post could be inserted into a cylindrical aperture in the second clamp portion 121.

A thumb screw 126 is then screwed into a threaded aperture in the first clamp portion 120 and against the base of the support post 130, to securely hold the support post 130 within the first clamp portion 120. Means are also provided to ensure that the support post is inserted into the cylindrical aperture in the first clamp portion 120 in exactly the same rotational orientation each time the support post 130 is mounted on first clamp portion 120. This could include a slot and keyway arrangement, an irregularly shaped aperture in the first clamp 120 that is designed to receive a corresponding irregularly shaped base of the support post 130, or any other mechanism for ensuring the support post always assumes the same rotational orientation when it is inserted into the first clamp portion 120.

Figure 8:
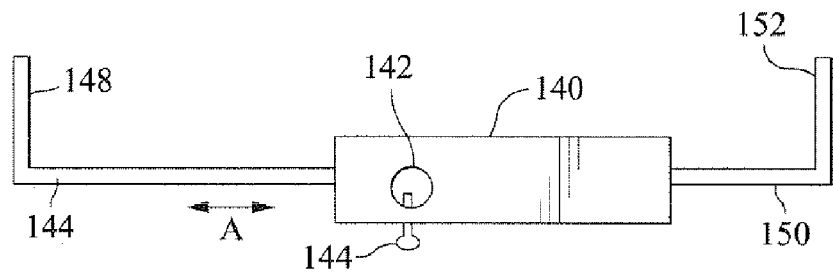
FIG. 8 is a top view of a turbine blade measuring device.
Figure 9:
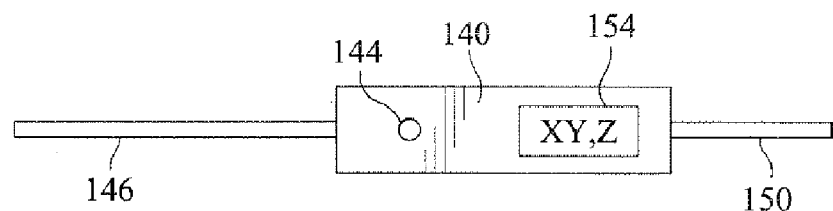
FIG. 9 is a front view of the turbine blade measuring device illustrated in FIG. 8.

A measuring device which is designed to be movably mounted on the support post 130 is illustrated in FIGS. 8 and 9. The measuring device 140 includes a mounting aperture 142 which is designed to receive the support post 130. A positioning pin 144 is movably mounted on the measuring device so that it can extend into the mounting aperture 142. In some embodiments, the positioning pin 144 is biased in a direction that causes the end of the positioning pin to extend into the mounting aperture.

Figure 10:
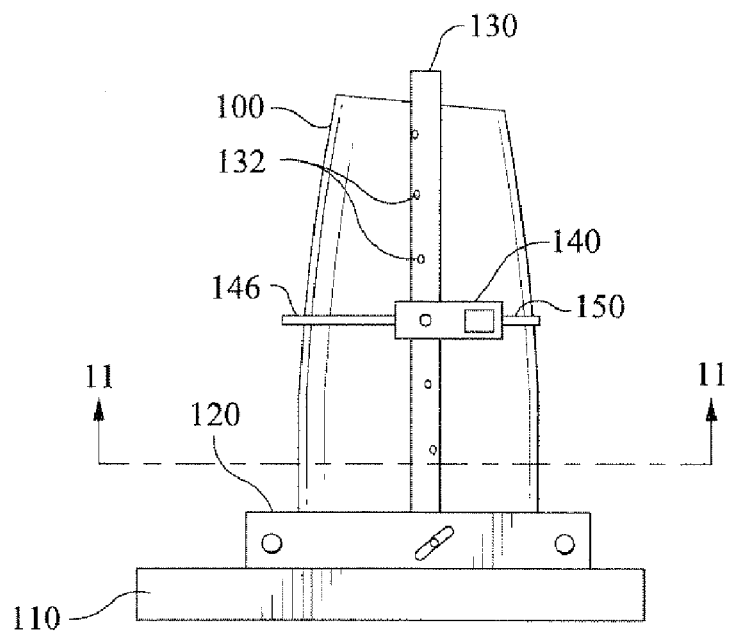
FIG. 10 is an elevation view showing a turbine blade with a measuring device mounted on the turbine blade.

FIG. 10 shows the measuring device 140 mounted on the support post 130. A plurality of positioning holes 132 are formed in the support post 130. The end of the positioning pin 144 on the measuring device 140 is designed to be received in each of the positioning holes 132 on the support post 130. The positioning pin 144 would be biased inward towards the position illustrated in FIG. 8. However, an operator would be able to pull the positioning pin 144 outward so that the measuring device 140 can be slid upward and downward along the support post 130. Once the measuring device 140 has been positioned adjacent to one of the positioning holes 132, the operator would release the positioning pin 144 and allow it to move into that positioning hole 132. This will lock the measuring device at a particular location along the length of the support post 130.

The mechanism described above allows the measuring device 140 to be moved along the support post 130 to a plurality of predetermined positions. The engagement between the positioning pin 144 on the measuring device 140 and the positioning holes 132 on the support post 130 ensure that the measuring device comes to rest at exactly the same predetermined position each time the positioning pin 144 is received in one of the positioning holes 132.

To ensure that the measuring device is positioned at the same repeatable positions above the first clamp portion 120 each time the measuring device is assembled, it is desirable to ensure that the support post 130 is always seated into the first clamp portion 120 at the same depth each time the measuring device is re-assembled. This can be accomplished by ensuring that the support post 130 is always fully seated in the cylindrical aperture in the first clamp portion 120 each time the measuring device is re-assembled. In some embodiments, the end of the thumbscrew 126 may seat into an aperture or groove in the support post 130 to ensure it is properly positioned and seated in the first clamp portion 120.

As illustrated in FIGS. 8 and 9, the measuring device includes a first arm 146 with a first contact finger 148 and a second arm 150 with a second contact finger 152. One or both of the first arm 146 and the second arm 150 are movable in the direction of arrows A with respect to the main body of the measuring device 140. The measuring device 140 also includes a display 154 which provides an indication of the distance between the first contact finger 148 and the second contact finger 152.

As illustrated in FIG. 10, the measuring device 140 can be moved into each of multiple predetermined positions defined by the positioning holes 132 on the support post 130. Once positioned at a predetermined location, the first arm and/or second arm 150 is moved inward so that first contact finger 148 engages a leading or trailing edge of a turbine blade 100, and the second contact finger 152 contacts the other edge of the turbine blade 100. The display 154 would then provide an indication of the chord length of the turbine blade at that predetermined height above the base of the turbine blade.

As explained above, and as illustrated in FIG. 3, a turbine blade typically twists between the base of the blade and the top of the blade. As a result, in order to obtain an accurate chord measurement at all locations along the length of the blade, it is necessary to rotate the measuring device slightly as the measuring device moves from the base of the turbine blade upward towards the top. This keeps the first and second arms 146, 150 of the measuring device 140 approximately parallel to the central longitudinal axis of the turbine blade.

As illustrated in FIGS. 6 and 10, the positioning holes 132 on the support post 130 are oriented at a plurality of different rotational orientations around the central axis of the support post 130. As a result, each time the measuring device 140 is moved into one of the predetermined positions, and the positioning pin 144 is inserted into one of the positioning holes 132, the measuring device 140 is positioned at a new rotational orientation with respect to the turbine blade 100. By forming the positioning holes 132 at different rotational orientations around the central axis of the support post 130, it is possible to keep the measuring device 140 properly oriented with respect to the face of the blade, despite the fact that the blade twists as it extends upward from the base.

Because the positioning holes 132 in the support post 130 must be oriented at different rotational positions to accommodate the twist of a blade, it is necessary to take the specific characteristics of a single turbine blade into account when deciding how to orient the positioning holes 132. As a result, a different support post will likely be created for each blade design. In some limited circumstances, however, such as where two different blades have highly similar twist characteristics, it may be possible to use the same support post with both of the blades.

When a turbine engine is undergoing a maintenance operation, a device as described above can be used by the maintenance personnel to take a series of measurements on selected blades to determine if there has been any significant erosion or other change in the shape of the blades. To accomplish this, an operator would first disassemble the measuring device 140 from the support post 130, and remove the support post 130 from one of the clamp portions.

The operator would then move the first and second clamp portions 120, 121 into position around the base of the blade that is to be measured. As mentioned above, this would typically be accomplished by inserting the clamp portions between two adjacent stator vanes on either the compressor or turbine section of the engine, and clamping them around one of the blades in the first row of rotating blades. In some instances, it might be necessary to completely disassemble the first clamp portion from the second clamp portion. In other instances, such as where one end of the first clamp portion is hinged to an end of a second clamp portion, it might be possible to leave the first and second clamp portions at least partially attached to each other while they are positioned on either side of the base of a blade. In any event, the clamp portions would then be affixed to the base of the rotating blade.

Next, the operator would mount the support post 130 on one of the clamp portions. Finally, the measuring device 140 would be mounted on the support post 130. In many instances, it may be possible to mount the measuring device 140 on the support post before the support post is passed through adjacent stator vanes and mounted on the clamp portion.

Once the measuring device is fully assembled, an operator could take a series of measurements on the blade upon which the device is mounted. This could include positioning the measuring device at the lowest predetermined position on the support post 130, and then taking a series of chord measurements at each predetermined position along the length of the support post. Alternatively, the measurements could begin at the top of the blade and the operator could work downward, taking measurements through each of the predetermined positions.

Figure 11:
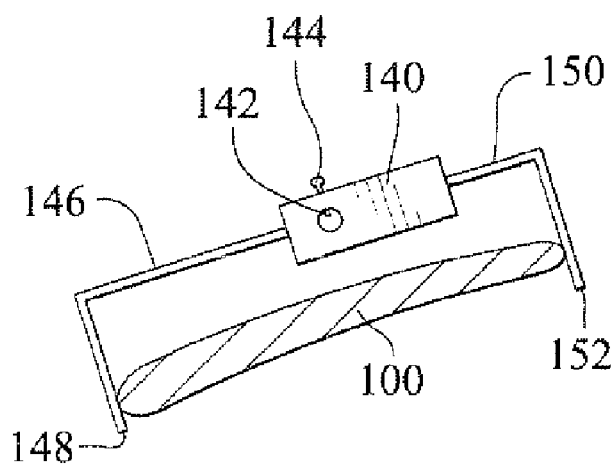
FIG. 11 is a cross-sectional view of the turbine blade and measuring device illustrated in FIG. 10, taken along Section Line 11-11.

Each time the arms 146, 150 of the measuring device are brought into engagement with the leading and trailing edges of the blade 100, as illustrated in FIGS. 10 and 11, the chord length measurement would be displayed on the display 154. The operator could visually read the measurement and record the measurement. In alternate embodiments, the measurement device might be electrically coupled to an external display that shows the chord measurement. In this instance, the external display could be positioned completely outside the turbine, which would make it easier to read. In still other embodiments, the measurement device may be electrically coupled to a recording device which automatically records and stores the measurements.

The measurements taken at a first point in time could be compared to corresponding measurements taken at a second point in time. Because the measurements on each blade are being taken at predetermined repeatable positions, the measurements can be compared to one another to determine if any significant deterioration of the material of the blades has occurred.

In some instances, the blades of a compressor or turbine section may be numbered. In this instance, the chord length measurements would be recorded against the specific blade number. By recording the measurements against a specific blade, one is able to compare measurements taken at one point in time on a particular blade to measurements taken on the same blade at a second point in time. This allows one to determine how much the measurements have changed for that specific blade during the time between the measurements.

If the blades cannot be individually identified, the measurements taken on multiple blades at a first point in time could be averaged. A second set of measurements taken at a second point in time could also be averaged. And the difference between the average values would provide an indication of how much the blades have changed during the time between the measurements.

If averages of the specific measurements are being calculated, a different average value for the measurements at each predetermined height above the base could be calculated. And the averages at each height level at a first point in time could be compared to the average at each height level at a second point in time. Thus, one would be able to determine how the average measurements have changed at each height.

Also, rather than comparing actual or average blade measurements from a first point in time to the same measurements at a second point in time, one can compare the actual or average measurements to the dimensions of the blades when they were first installed.

Because a typical turbine includes many rotating blades in each row, measuring all the blades in the first row might be more time consuming than is necessary. Instead, during a measurement cycle, the operators could only measure only a percentage of the total number of blades in a row of blades. If fewer than all the blades are being measured, the operators may measure blades at positions that are spaced around the circumference of the turbine. For instance, if the operators intend to only measure 10 of the blades, they could ensure that the ten blades that are measured are spaced approximately equally around the circumference of the turbine, rather than simply measuring ten blades that are all adjacent to one another.

Figure 12:
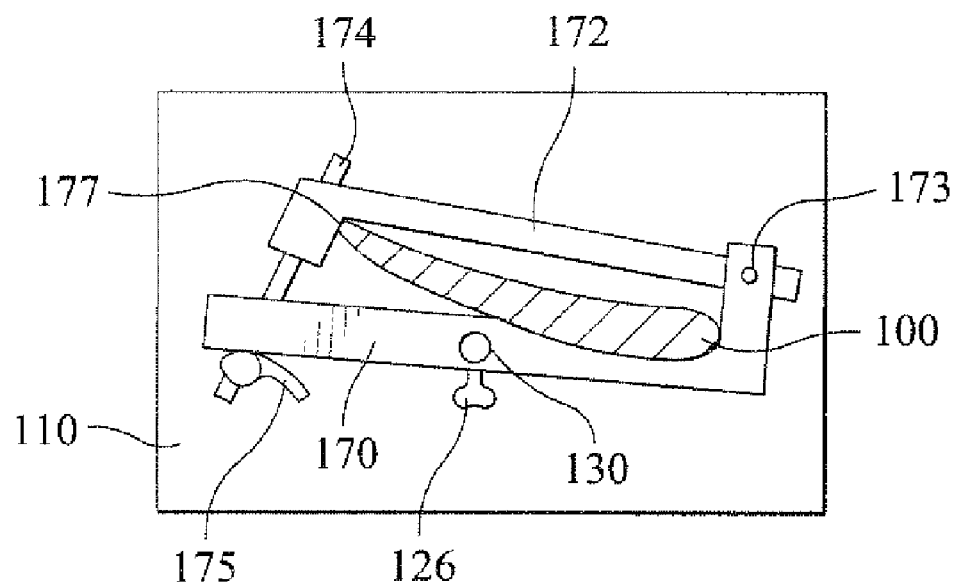
FIG. 12 is a cross-sectional view similar to FIG. 7 illustrating an alternate embodiment of a measuring device clamped onto a turbine blade.

FIG. 12 shows an alternate embodiment of the clamping portion of a measurement device. This embodiment is intended to be easier to quickly position around the base of a turbine blade during a measurement operation.

As illustrated in FIG. 12, a first clamp portion 170 is attached a second clamp portion 172 by a hinge connection, which allows the second clamp portion 172 to pivot around a pivot axis 173 on the first clamp portion 170. In addition, a quick release device 175 is attached to a fastener 174 that passes between the first clamp portion 170 and the second clamp portion 172. The quick release device 175 allows an operator to quickly and easily detach the free ends of the first clamp portion 170 and the second clamp portion 172. At which point, the two clamp portions can be pivoted away from each other to remove them from a blade, or so that the clamp portions can be fitted around the base of a new blade. Once the first and second clamp portions are fitted around the base of a blade, the fastener 174 and the quick release device 175 allow the two clamp portions to be drawn together to clamp onto the base of the blade.

The material of the first clamp portion 170 would be contoured to abut a first side and edge of the blade 100, and the opposite edge of the blade would come to rest in an angled corner 177 of the second clamp portion 172. This would allow the clamping mechanism to be repeatably positioned at essentially the same location on the base of a plurality of identically shaped turbine blades.

Figure 13:
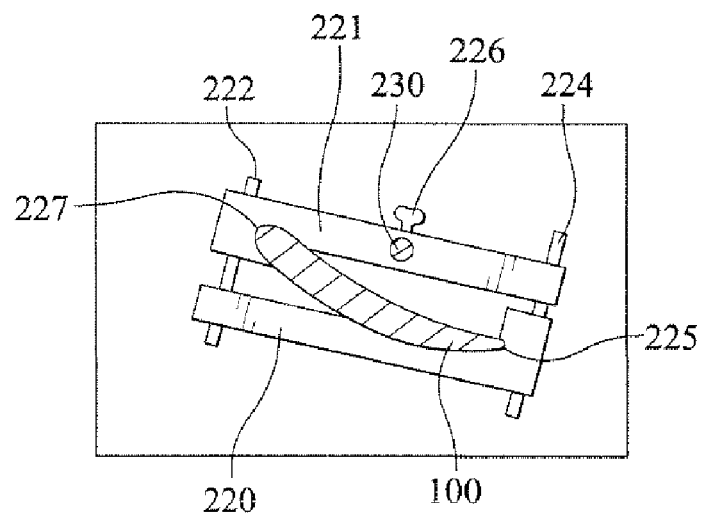
FIG. 13 is a cross-sectional view similar to FIG. 7 illustrating another alternate embodiment of a measuring device clamped onto a turbine blade.

FIG. 13 illustrates yet another embodiment of a clamping mechanism. In this embodiment, both the first clamp portion 221 and the second clamp portion 220 have contoured corners 225, 227 that are designed to engage the leading and trailing edges of a plurality of identically shaped blades 100. A first fastener 222 and a second fastener 224 are used to clamp the two pieces of the mechanism together and to draw them against opposite sides of the turbine blade 100.

Although FIGS. 7, 12 and 13 illustrate various different embodiments of the clamping mechanism, different clamping mechanisms having different shapes, different numbers of parts, and different fasteners could also be used. Any combination of elements which could be repeatably clamped onto the base of a turbine blade in essentially the same position/orientation could be used.

Moreover, although the embodiments described above are configured to clamp onto the base of a rotating blade, alternate embodiments could be configured to clamp onto other locations on a blade. The important point is that the clamp be capable of repeatably clamping onto a blade in essentially the same location/orientation.

Figure 14:
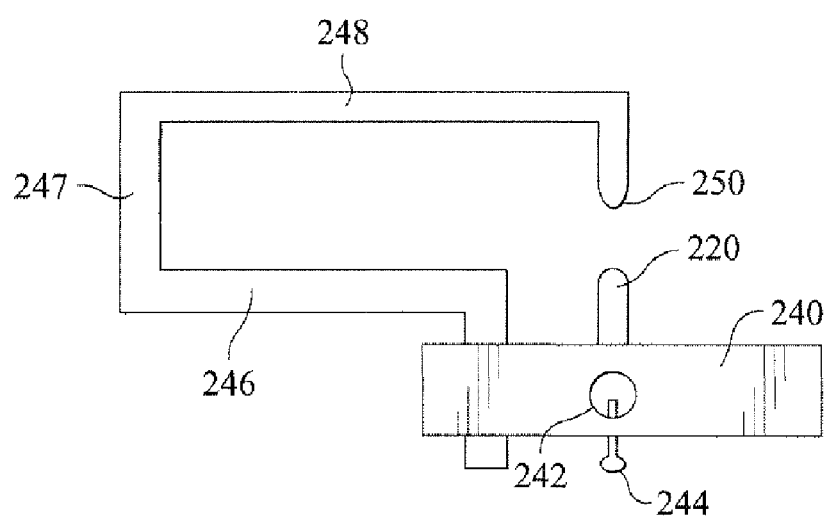
FIG. 14 is a top view of another measuring device which can be used to measure the thickness of a turbine blade.

Also, in the embodiment described above and illustrated in FIGS. 6-12, the measuring device 140 is designed to measure the chord length of a blade. FIG. 14 illustrates an alternate embodiment which is designed to measure the thickness of a blade.

As shown in FIG. 14, the measuring device 240 still includes a mounting aperture 242 which is designed to receive a support post 130. A positioning pin 244 still is designed to engage positioning holes 132 on the support post 130.

In this embodiment, the measuring device includes a first feeler 220 and a second feeler 250. The second feeler 250 is positioned on a C-shaped arm which includes a first section 246, a second section 247, and a third section 248. Either or both of the first feeler 220 and the second feeler 250 would be designed to move towards each other and/or away from each other to vary the spacing between the first feeler 220 and the second feeler 250. A display on the measuring device 240 would indicate the spacing between the first feeler 220 and the second feeler 250.

A measuring device as illustrated in FIG. 14 could be used to measure the thickness of a blade at a plurality of different heights along the blade, similar to the chord length measurements described with the previous embodiments.

In each of the embodiments described above, it was necessary for an operator to physically move the measuring device along the support post 130 to move the measuring device between the plurality of predetermined positions. In alternate embodiments, the measuring device may be designed with a drive mechanism which automatically moves the measuring device to different predetermined locations along a support post.

Figure 15:
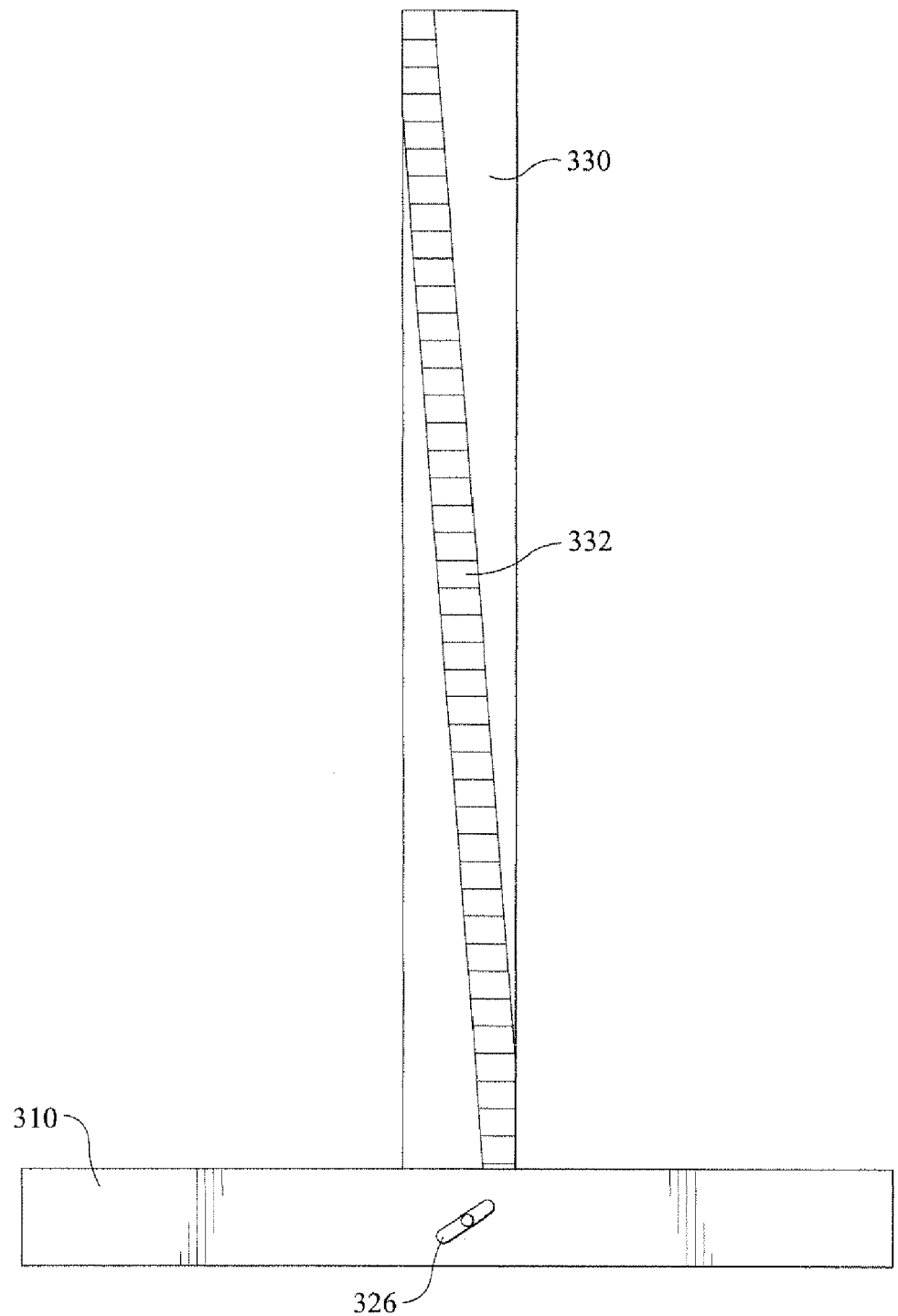
FIG. 15 is an elevation view of a clamp and support post of an alternate embodiment of a turbine blade measuring device.

In the embodiment illustrated in FIG. 15, a support post 330 is still mounted on a clamping mechanism 310 that would be clamped to the base of a blade. This embodiment also includes a thumb screw 326 which allows the support post 330 to be fixed with respect to the mounting base 310. As with the previous embodiments, the mounting mechanism which attaches the support post 330 to the clamping base 310 could ensure that the support post 330 is always mounted in the same rotational orientation with respect to the mounting base 310.

In this embodiment, a rack gear 332 is formed along the exterior surface of the support post 330. The rack gear travels a spiral or helical path along the exterior of the support post 330.

A support post 330 as illustrated in FIG. 15 would be used with a measuring device 240 which includes a pinion gear designed to engage the rack gear 332 on the support post 330. A drive mechanism including an electric motor would be attached to the pinion gear to rotate the pinion gear, and to thereby drive the measuring device along the support post 330. Because the rack gear 332 spirals along the exterior of the support post 330, the measuring device would be gradually rotated as it moves along the support post to ensure that the measuring device properly engages the measured surfaces of a twisting turbine blade.

Figure 16:
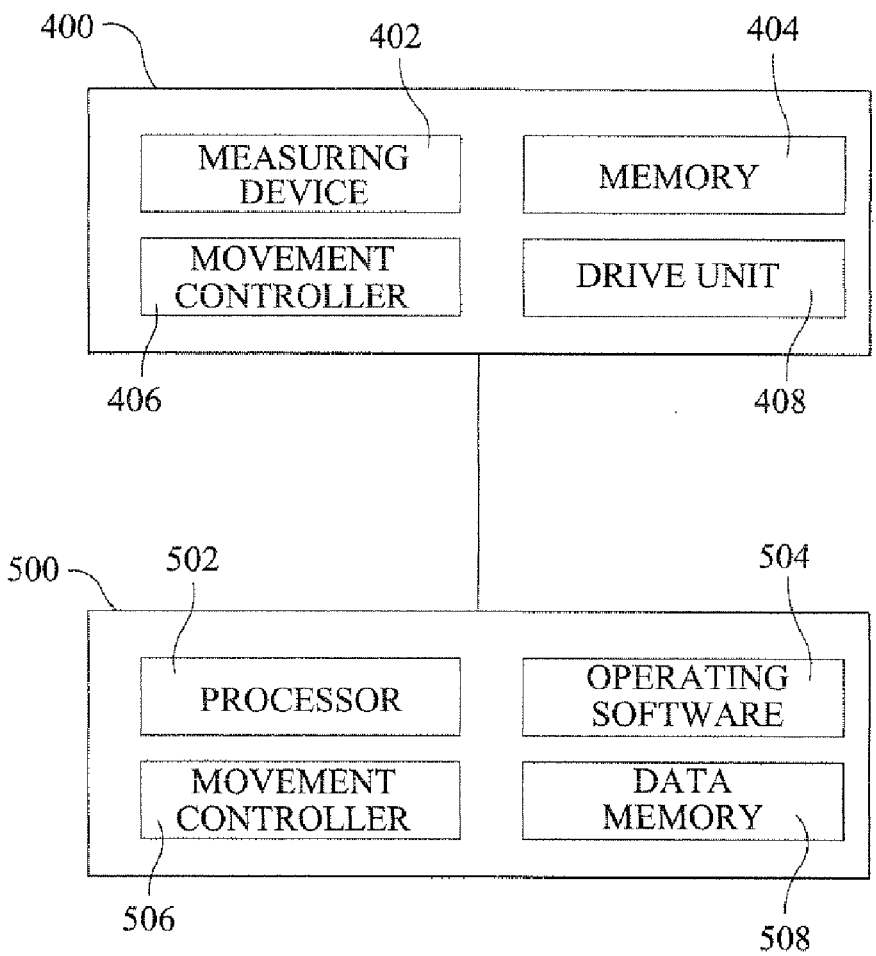
FIG. 16 is a block diagram illustrating elements of a turbine blade measuring device and a data logging device.

FIG. 16 illustrates a block diagram of a measuring device 400 which could be used with a support post 330 having a rack gear 332, as illustrated in FIG. 15. The measuring device 400 includes a measuring device 402 designed to measure some aspect of a turbine blade, such as the chord length or the thickness. The measuring device 400 also includes a drive unit 408 which would include a motor and a pinion gear designed to engage the rack gear 332 on the support post 330. The measuring device 400 also includes a movement controller 406 which controls the drive unit 408 so that the measuring device 400 is moved to a plurality of predetermined positions along the support post 330.

The measuring device 400 could also include a memory unit 404. The memory unit could be used to store information necessary to help the movement controller 406 control the drive unit 408 so that the measuring device 400 is moved to a plurality of predetermined positions. In addition, the memory 404 could be used to store measurements taken on the blades.

The embodiment illustrated in FIG. 16 also includes a data logger 500, which is coupled to the measuring device 400. The data logger 500 would include a processor 502, operating software 504, and a data memory 508. The data logger 500 might also include a movement controller 506.

In some embodiments, the measuring device 402 would output measurement results which are sent to the data memory 508 of the data logger 500. The data logger 500 might also provide instructions to the measuring device via the movement controller 506 to cause the measuring device 400 to move to different predetermined positions along a support post.

In some embodiments, it would be possible to update the operating software 504 of the data logger, and also the memory 404 and movement controller 406 of the measuring device so that measurements could be taken on different types of turbine blades. It would also be possible to reconfigure the operating software and the various controllers so the measurements could be taken at different predetermined positions along the length of various different turbine blades.

In the foregoing description, it was assumed that measurements were taken on rotating blades of a turbine engine. The same basic measuring device could also be used to take measurements on the stator vanes of a turbine engine.

In the foregoing description, the chord length and the thickness of blades was measured by the measuring device. However, in alternate embodiments, the measuring device could be configured to obtain measurements of different aspects of the blades or stator vanes.

Also, in the foregoing description, the measuring device utilized feelers that actually come into contact with a blade or stator vane to obtain a measurement. In alternate embodiments, different types of measuring devices could be used. For instance, optical measuring devices and laser based measuring devices could be substituted for the touch-based measuring devices described above.

Although the above description was provided in the context of a turbine engine used in the power generation industry, the described measuring devices could also be used on turbine engines used on aircraft, on stand-alone axial compressors, on steam turbines, on wind turbines, and on a variety of other turbines and compressors that include stationary and rotating blades.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine blade measuring device, comprising:
a clamp configured to be removably clamped to a turbine blade, wherein the clamp comprises:
a first clamp portion configured to engage a first portion of a turbine blade,
a second clamp portion configured to engage a second portion of a turbine blade, and
an attachment mechanism that urges the first clamp portion towards the second clamp portion such that a turbine blade can be clamped between the first clamp portion and the second clamp portion, the attachment mechanism including a hinge that couples a first end of the first clamp portion to a first end of the second clamp portion, and a fastener that couples a second end of the first clamp portion to a second end of the second clamp portion, wherein the fastener is configured to move the second ends of the first and second clamp portions toward each other;
a guide that is removably mountable on the clamp; and
a measuring device that is movably mountable on the guide, wherein the measuring device is configured to measure an aspect a turbine blade.

2. The turbine blade measuring device of claim 1, wherein the fastener includes a quick release mechanism that allows the second end of the first clamp portion to be quickly decoupled from the second end of the second clamp portion.

3. The turbine blade measuring device of claim 1, wherein at least one of the first clamp portion and the second clamp portion includes a blade engagement surface that facilitates mounting the clamp in a repeatable position on a turbine blade having a predetermined shape.

4. The turbine blade measuring device of claim 1, wherein the guide includes a positioning mechanism that is configured to position the measuring device at a plurality of predetermined locations along the guide.

5. The turbine blade measuring device of claim 4, wherein the positioning mechanism is configured to position the measuring device at a plurality of predetermined positions with respect to the clamp.

6. The turbine blade measuring device of claim 5, wherein the positioning mechanism is configured to position the measuring device at a plurality of predetermined heights above the clamp.

7. The turbine blade measuring device of claim 6, wherein the positioning mechanism is also configured to position the measuring device at a plurality of predetermined rotational orientations with respect to the clamp.

8. The turbine blade measuring device of claim 4, wherein the positioning mechanism comprises a plurality of positioning apertures in the guide, wherein the measuring device includes a positioning pin, and wherein when the measuring device is mounted on the guide, the positioning pin is insertable into the positioning apertures in the guide to position the measuring device at a plurality of predetermined positions along the guide.

9. The turbine blade measuring device of claim 8, wherein the positioning apertures in the guide each have a longitudinal axis, and wherein the longitudinal axes of the positioning apertures are not parallel to one another.

10. The turbine blade measuring device of claim 4, wherein the guide comprises a rack gear that extends along the guide, wherein the measuring device comprises a motor and a pinion gear coupled to the motor, and wherein when the measuring device is mounted on the guide, the pinion gear engages the rack gear such that rotation of the pinion gear will cause the measuring device to move along the guide.

11. The turbine blade measuring device of claim 1, wherein the measuring device is configured to measure a chord length of a turbine blade.

12. The turbine blade measuring device of claim 11, wherein the guide is configured to position the measuring device at a plurality of predetermined heights above a base of the blade such that the measuring device can measure the chord length of the blade at a corresponding plurality of heights above the base of the blade.

13. The turbine blade measuring device of claim 12, wherein the guide is configured to position the measuring device at a plurality of predetermined rotational orientations with respect to a turbine blade.

14. The turbine blade measuring device of claim 1, wherein the measuring device is configured to record a plurality of turbine blade measurements in an internal memory.

15. The turbine blade measuring device of claim 1, wherein the measuring device is configured to output a data signal that is indicative of a turbine blade measurement.

16. The turbine blade measuring device of claim 15, further comprising a data recorder that coupled to the measuring device, wherein the data recorder records turbine blade measurements taken by the measuring device.

17. The turbine blade measuring device of claim 1, wherein the measuring device is configured to measure a thickness of a turbine blade.

18. A turbine blade measuring device, comprising:
a clamp configured to be removably clamped to a turbine blade;
a guide that is removably mountable on the clamp, wherein a plurality of positioning apertures are provided in the guide, wherein the positioning apertures in the guide each have a longitudinal axis, and wherein the longitudinal axes of the positioning apertures are not parallel to one another; and
a measuring device that is movably mountable on the guide, wherein the measuring device includes a positioning pin, wherein when the measuring device is mounted on the guide, the positioning pin is insertable into the positioning apertures in the guide to position the measuring device at a plurality of predetermined positions along the guide, and wherein the measuring device is configured to measure an aspect a turbine blade.

19. A turbine blade measuring device, comprising:
a clamp configured to be removably clamped to a turbine blade;
a guide that is removably mountable on the clamp, wherein the guide comprises a rack gear that extends in a spiral fashion along the exterior of the guide; and
a measuring device that is movably mountable on the guide, wherein the measuring device is configured to measure an aspect a turbine blade, the measuring device including a motor and a pinion gear coupled to the motor, and wherein when the measuring device is mounted on the guide, the pinion gear engages the rack gear such that rotation of the pinion gear will cause the measuring device to move along and rotate about a longitudinal axis of the guide.

* * * * *